J. O'BRIEN.
RUNNER ATTACHMENT FOR AUTOMOBILES.
APPLICATION FILED MAR. 13, 1917.
1,236,343.
Patented Aug. 7, 1917.
2 SHEETS—SHEET 1.
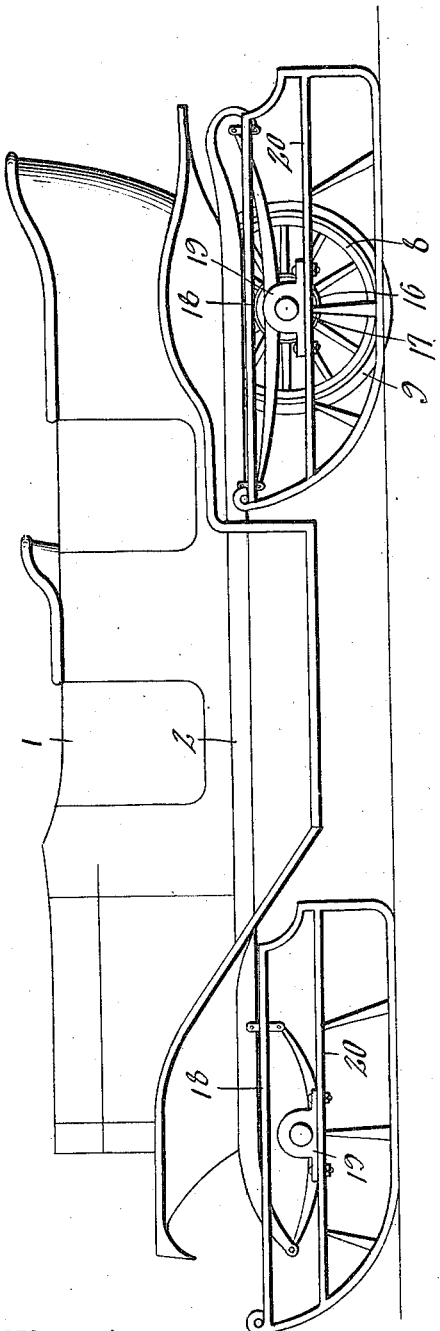
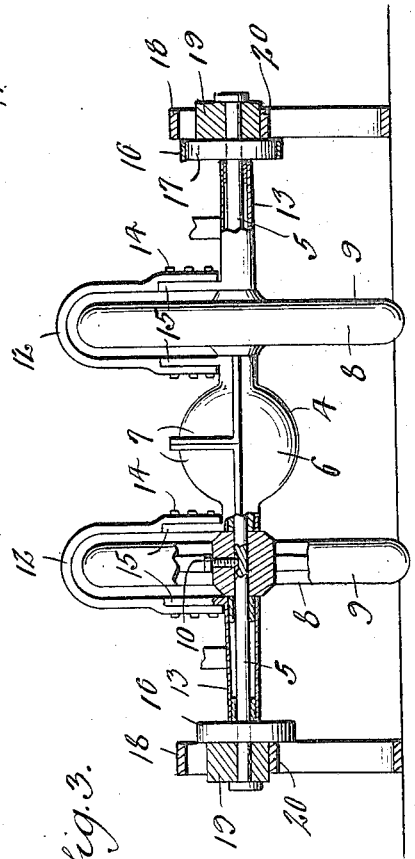
WITNESSES
INVENTOR
J. O'Brien,
BY Victor J. Evans
ATTORNEY

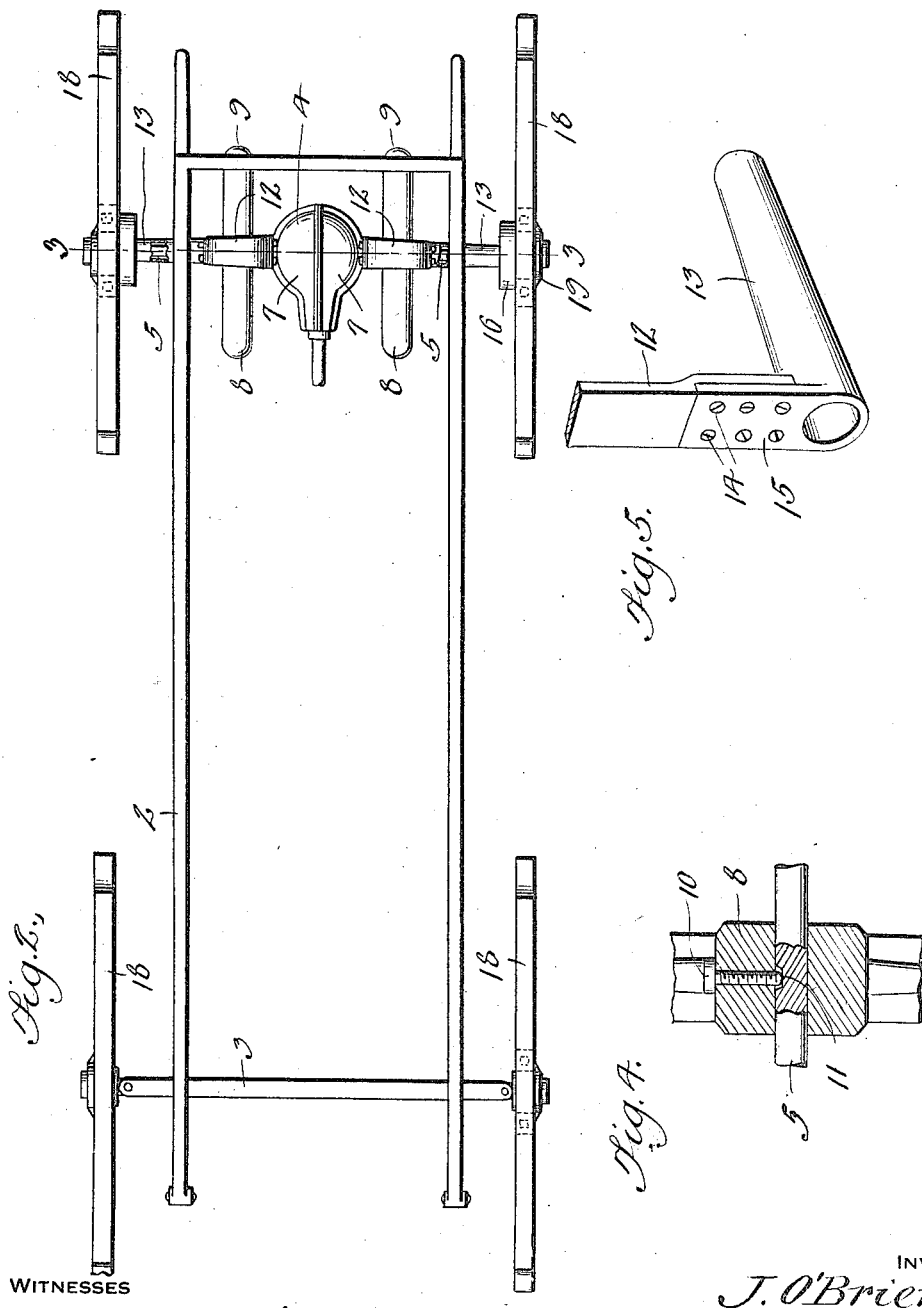

UNITED STATES PATENT OFFICE.

JOHN O'BRIEN, OF BUFFALO, NEW YORK.

RUNNER ATTACHMENT FOR AUTOMOBILES.

1,236,343.  Specification of Letters Patent.  Patented Aug. 7, 1917.

Application filed March 13, 1917. Serial No. 154,537.

*To all whom it may concern:*

Be it known that I, JOHN O'BRIEN, a citizen of the United States, residing at Buffalo, in the county of Erie and State of New York, have invented new and useful Improvements in Runner Attachments for Automobiles, of which the following is a specification.

This invention relates to runner attachments for automobiles and has for one of its objects, the conversion of an automobile into a power sleigh by substituting runners for the wheels of the automobile and providing auxiliary driving wheels.

Another object of the invention is to provide a runner attachment for an automobile which will convert the machine into a power driven sleigh without increasing the width thereof and which may be incorporated in the machine with but slight modification of the features thereof.

The invention also aims to generally improve devices of this nature to render them more practical, useful and commercially desirable.

With these and other objects in view as will become more apparent as the description proceeds, the invention consists in certain novel features of construction, combination and arrangement of parts as will be hereinafter fully described, illustrated and claimed.

In the drawings,

Figure 1 is a side elevation showing the application of my runner attachments for an automobile.

Fig. 2 is a top plan view of the running gear.

Fig. 3 is a transverse section on the plane of line 3—3 of Fig. 2, and

Figs. 4 and 5 are detail views of parts to be hereinafter more fully described.

Referring in detail to the drawings by numerals, 1 designates the body of an automobile, 2 the chassis, 3 the front axle and 4 the rear axle having the sections 5. The sections 5 of the rear axle are connected and driven by differential gearing in the usual manner, said gearing being inclosed in a casing having the bottom section 6 and the mated top sections 7.

Driving wheels 8 are secured to the rear axle on each side of the differential gearing and these wheels are preferably provided with solid rubber tires 9 for engagement with the snow or ice. If desired, the driving wheels may be provided with spurs or other snow engaging devices which will prevent slipping. Each wheel 8 is preferably secured to its axle section 5 by a set screw 10 which projects into a groove or key way 11 formed in the axle section.

A substantially U shaped frame 12 connects each of the axle housings 13 to the gear casing. These frames or brackets are preferably secured to the top sections 7 of the gear casing by suitable fasteners 14 which connect with the upstanding arms 15 formed on the sections 7 adjacent their outer ends. Suitable braking mechanism consisting of a brake band 16 and drum 17 may be provided for each of the axle sections 5 to brake the wheels 8.

A runner 18 of suitable width and a slightly rounded bottom face is provided for attachment to each of the front axles or spindles and to the spindles of the rear axles. These runners are each provided with a journal 19 secured to a brace bar 20 for receiving one of the vehicle spindles. With the runners in position, the wheels 8 will furnish the necessary power to drive the vehicle over snow and ice and the braking mechanism makes it possible to quickly stop the vehicle when desired.

From the foregoing description taken in connection with the accompanying drawings, it will be apparent that I have provided a very simple and practical power sleigh which derives its motive force from the rear axle of a motor vehicle and which may be incorporated in an automobile or other motor vehicle with but slight modification of the parts thereof.

While I have shown and described the preferred embodiments of my invention, it will be clearly understood that I do not wish to be limited to this construction but may make such changes as will fall within the scope and spirit of the invention as claimed.

What I claim is:—

In a motor sleigh, a rear axle formed of two sections, differential gearing driving said sections, a differential casing, a casing for each of the axle sections, U shaped frames connecting the differential casing with the axle sections, a driving wheel secured to each of the axle sections within said U shaped frame, runners journaled on the outer ends of the axle sections, and brake mechanism for the driving wheels.

In testimony whereof I affix my signature.

JOHN O'BRIEN.

Copies of this patent may be obtained for five cents each, by addressing the "Commissioner of Patents, Washington, D. C."